Oct. 8, 1940.  P. K. KREISZL  2,216,885
IGNITION TESTER FOR INTERNAL COMBUSTION ENGINES
Filed July 23, 1938  2 Sheets-Sheet 1
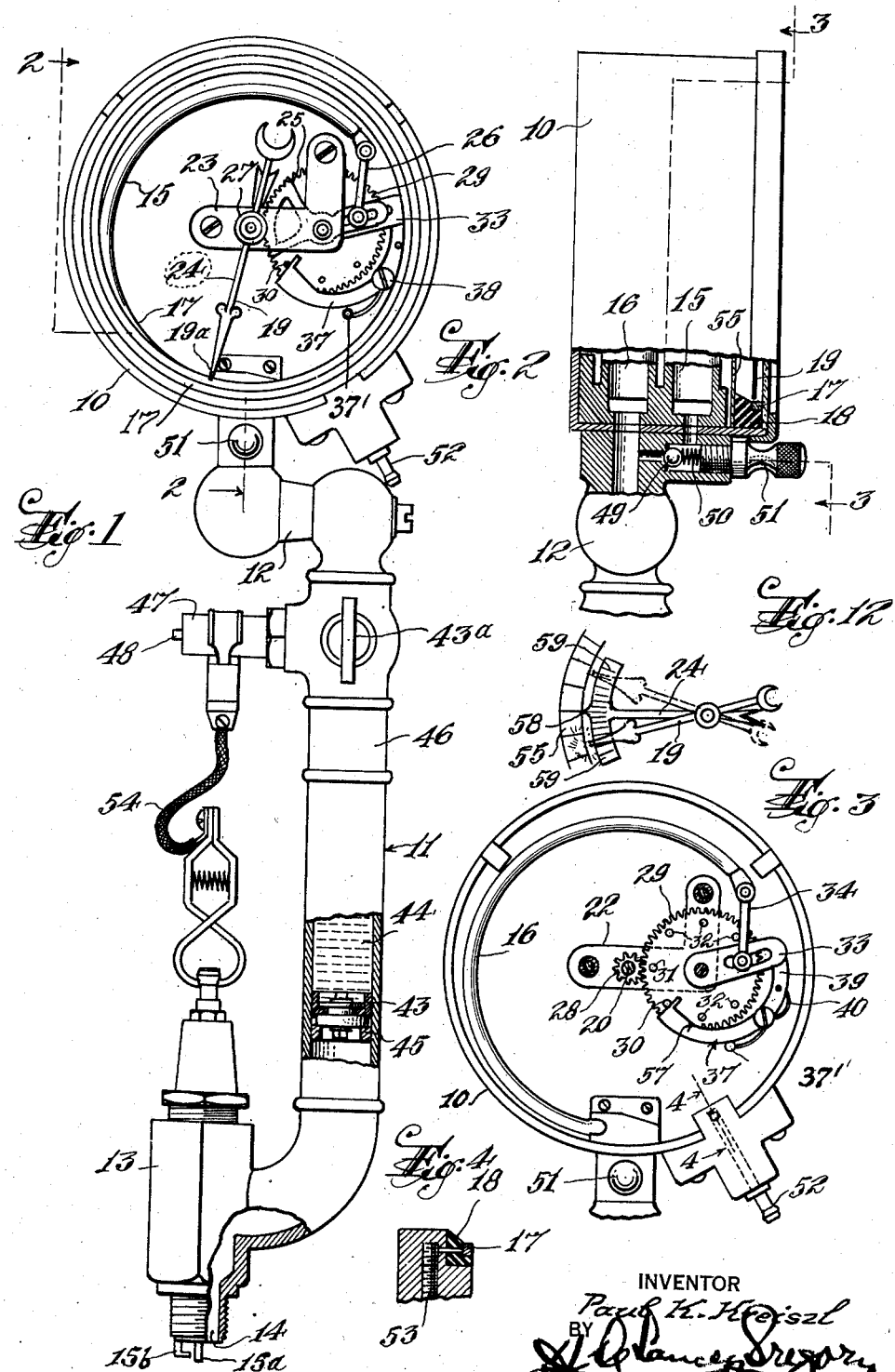

Oct. 8, 1940.  P. K. KREISZL  2,216,885
IGNITION TESTER FOR INTERNAL COMBUSTION ENGINES
Filed July 23, 1938  2 Sheets-Sheet 2
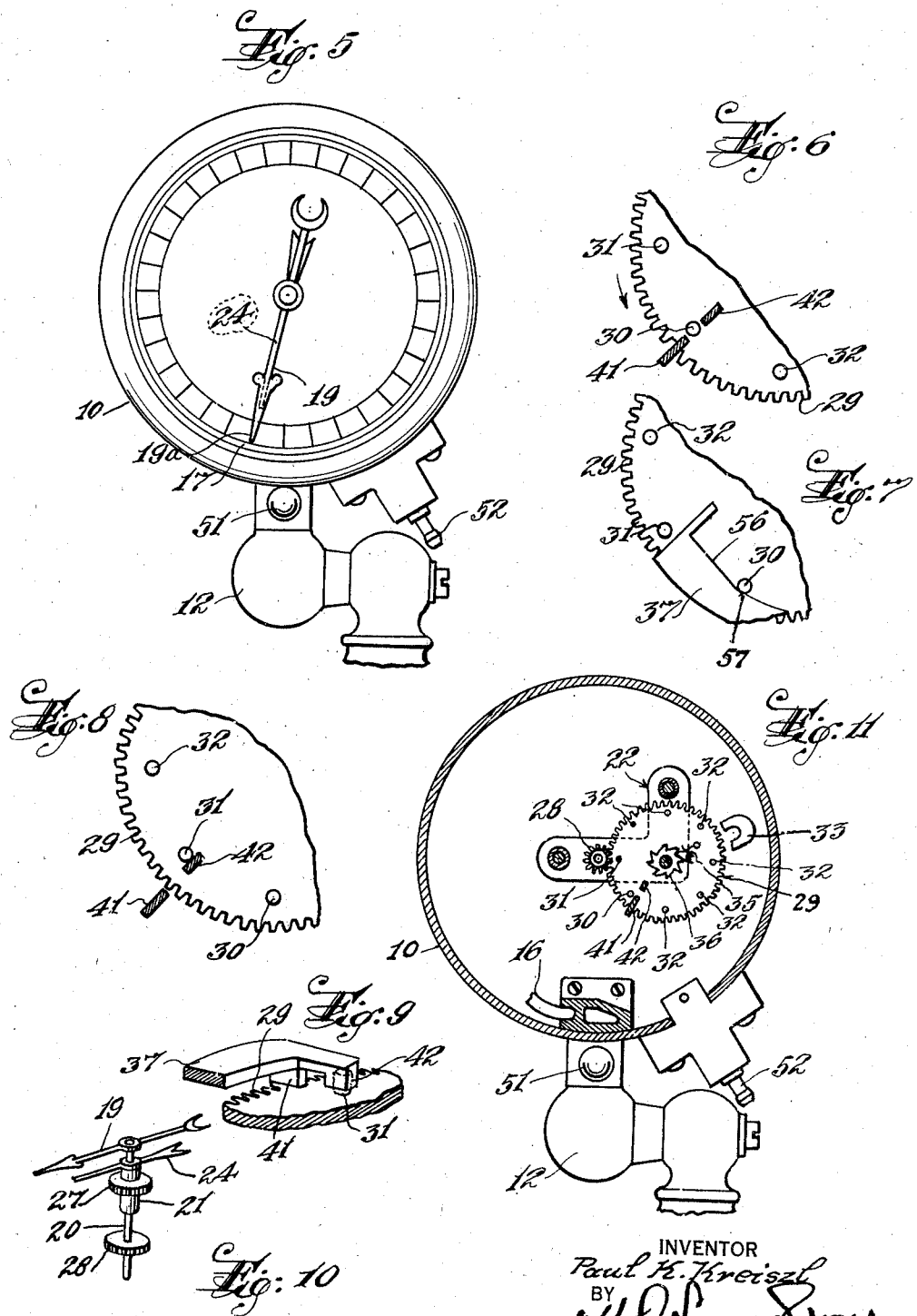
INVENTOR
Paul K. Kreiszl
BY
ATTORNEY Patented Oct. 8, 1940

2,216,885

UNITED STATES PATENT OFFICE 2,216,885

IGNITION TESTER FOR INTERNAL COMBUSTION ENGINES

Paul K. Kreiszl, Newark, N. J.

Application July 23, 1938, Serial No. 220,899

3 Claims. (Cl. 177—311)

My invention relates to improvements in indicators of the type more particularly adapted for testing internal combustion engines.

One of the objects of my invention is the provision of an improved indicator of the character referred to by which both the ignition-timing and the maximum pressure of explosion in the engine cylinder can be obtained.

Another object of my invention is the provision of an improved indicator of the character referred to which can be easily and quickly applied to an engine cylinder, and which is relatively simple in construction and manner of operation.

Other objects and advantages will hereinafter appear.

For the purpose of illustrating my invention, an embodiment thereof is shown in the drawings, wherein:

Figure 1 is a front elevational view of an indicator constructed and operating in accordance with my invention, some of the parts being removed for the sake of clearness;

Fig. 2 is a section taken on the line 2—2 in Fig. 1;

Fig. 3 is a section taken on the line 3—3 in Fig. 2;

Fig. 4 is an enlarged sectional view, taken on the line 4—4 in Fig. 3;

Fig. 5 is an elevational view similar to Fig. 1;

Figs. 6, 7, 8 and 9 are detail, fragmentary views illustrative of the operating action;

Fig. 10 is a fragmentary perspective view illustrative of the assembly of some of the parts;

Fig. 11 is a view similar to Fig. 3, but with some of the parts removed; and

Fig. 12 is a fragmentary, detail view of a modification.

With reference to the drawings, my improved indicator comprises a casing 10 connected to one end of a supporting tubular post 11 by a pivotal connection 12 of a conventional design. At the other end of the post 11 is a spark plug 13 provided with a passage 14 from the electrodes 15b, 15a and communicating through the post 11 with the fixed end of each of two Bourdon tubes 15 and 16 in the casing 10.

An electrode element in the form of a circular member or metal ring 17 is set in an insulating ring 18 within the casing. A second electrode element in the form of a pointer 19 is fixed on a spindle 20 which is journalled in a hollow stud 21 and in an L-shape bracket 22. The pointer 19 is thereby supported for rotary movement about an axis through the center of curvature of the ring 17, and is disposed with its end 19a in close proximity to the adjacent edge of the ring to form therewith a spark gap. The Bourdon tube 15 operates the pointer 24 through a connection of a conventional design comprising a gear segment 25 pivotally mounted between the brackets 22 and 23 and connected by a link 26 with the free end of the tube 15. A pinion 27 fixed on the stud 21 meshes with the segment 25.

The Bourdon tube 16 operates the pointer 19 through a connection comprising a pinion 28 fixed on the spindle 20 and which meshes with a gear 29 supported between the complementary brackets 22 and 23 and provided on its upper face with similar pins 30, 31 and 32. An arm 33 is also supported between brackets 22 and 23 for free rotation and is connected by a link 34 to the free end of the Bourdon tube 16. A dog 35 on the arm 33 engages a ratchet wheel 36 fixed with respect to the gear 29. An escapement lever 37 is pivotally mounted at 38, and its end 39 is held against the outer end of the arm 33 by a spring 40. The lever 37 is provided at its other end with spaced lugs 41 and 42. A stop 37' limits counter-clockwise movement of the lever 37.

A piston 43 is slidable in the post 11, and the space between the piston to and including the Bourdon tubes 15 and 16 is filled with a light oil 44 or other suitable liquid. Downward movement of the piston 43, that is, movement in the direction away from the Bourdon tubes, is limited to a definite point by a stop ring 45.

The post 11 has an insulating section 46.

Pressure within the post 11 and the Bourdon tubes 15 and 16 can be raised to an initial starting point by compressed air admitted through a check valve 47 of a conventional type such as is used for automobile tires, and which has a protruding valve stem 48.

As shown in Fig. 2, a check-valve is disposed at the fixed end of the Bourdon tube 15, and is arranged to permit fluid-flow only into this tube, and to prevent fluid-flow from this tube. This check-valve comprises a ball 49 which is yieldingly held against its seat by a coil spring 50 compressed between the ball and a plug 51.

In the use of my improved indicator to test operating conditions in a cylinder of an internal combustion engine, the spark plug thereof is removed and the spark plug 13 screwed into its place. In doing this, the pivotal connection 12 allows for angular adjusting movement of the indicator or measuring unit about an axis perpendicular to the post 11, which might be necessary to avoid parts which would obstruct the way in different engines.

The connection from the distributor which was previously removed from the first spark plug, is now clipped onto the protruding end 52 of a stud 53. Through a connection 54, the spark-plug 13 and the electrode elements 17 and 19 are now connected in series with the high tension side of the ignition system whereby there will occur simultaneous spark-discharge at the spark-plug and across the electrode elements 17 and 19.

Before commencing the test, compressed air is applied through the valve 47 until the pointer 24 just begins to leave the zero mark on the dial 55. In this way, it is assured that all lost motion in the various parts is taken up. Therefore, any reading on the calibrated dial 55 will be a true reading.

In operation, with the engine cylinder operating normally, the pointer 24 will be caused to rotate clockwise, as viewed in Figs. 1 and 5, through angular degrees in number proportional to occurring increase in the pressure within the cylinder.

The operating linkages and gearing are such as to cause the pointers 19 and 24 to move at the same rate. That is, the pinions 27 and 28 have the same pitch diameter and number of teeth, and the complementary gear segment 25 and gear 24 have the same pitch diameter and number of teeth.

In operation, pressure within the engine cylinder will be communicated to the Bourdon tubes 15 and 16 by way of the passage 14 at the electrodes 15b and 15a, piston 43, and the oil 44. Considering first the maximum-pressure indicating member or pointer 24, as the piston of the engine advances on the compression stroke thereof, the Bourdon tube 15 will respond to cause advance movement of the pointer 24, that is, clockwise rotation thereof, as viewed in Figs. 1 and 5, through angular degrees in number proportional to occurring increase in the pressure. At or substantially at the top of the compression stroke, when ignition occurs, the Bourdon tube 15 will respond to the sudden and large increase in pressure, and advance the pointer further clockwise to indicate the maximum pressure of explosion on the dial 55. The check valve 49 will hold the pressure in the tube 15, so that the pointer 24 remains at the indicating position for maximum pressure in the engine cylinder until it is released. This is done by unscrewing the plug 51 to permit leakage around the same, whereupon the pressure is relieved and the tube 15 and pointer 24 return to the initial position.

Considering now the ignition-timing action of my improved indicator, the lower end of connection 54 is first removed from the spark plug 13 and clipped onto the post 11 whereby the pointer 19 is grounded directly to the cylinder block and not through the electrodes 15 and 15a as before. During ignition-timing, therefore, no spark occurs across the electrodes 15 and 15a to cause combustion in the cylinder. Therefore, the pointer 24 for any one reading, will advance to and remain at a given point to provide a datum point representative of the top dead-center position of the piston. As the piston of the engine advances on the compression stroke thereof, the Bourdon tube 16 will respond to exert a pull on the link 34 and accordingly cause a counter-clockwise movement of the arm 33 and dog 35. Engagement of the dog 35 with the ratchet wheel 36 causes the gear 29 to rotate counter-clockwise, and by reason of the high step-up ratio to the pinion 28 causes the pointer 19 to rotate at a relatively high, uniform rate in the clockwise direction, as viewed in Figs. 1 and 5. When the point of piston-travel is reached at which ignition in the cylinder would have occurred if the connection 54 had not been removed from the spark plug 13 and clipped onto the post 11, a spark will be observed across the gap between the ring 17 and the end 19a of the pointer 19, and from a calibrated scale on the dial 55, it can be determined how many degrees the spark is advanced or retarded. The datum point, from which the degrees of spark-advance or spark-retard are measured, is the point on the scale at which the pointer 24 has stopped. As the arm 33 moves counter-clockwise, as just explained, the lever 37 follows this movement on account of the tensioned spring 40, and until arrested by the stop 37' to move the lugs 41 and 42 from the position thereof shown in Fig. 11 to that shown in Fig. 6, whereupon the next succeeding pin 30 is permitted to pass through and permit the gear 29 to rotate. The relation of the various parts is such that the pin 30 passes through freely, as shown in Fig. 6, at the beginning of the driving movement of the arm 33 and dog 35. However, before the pointer 19 completes the revolution, further movement of the lever 37 will have taken place, until arrested by the stop 37' to put the lug 42 in the position shown in Figs. 8 and 9, so that the lug 42 acts as a stop for the next pin 31 almost exactly when the pointer 19 has completed 360 degrees.

During the intake stroke of the engine piston, the pressure in the Bourdon tube 16 is relieved to permit it and the arm 33, dog 35 and lever 37 to return to the first positions thereof, as shown in Fig. 3. As the lever 37 returns to its first position, if the pin 30 is not exactly in the angular position for a rotation of the gear 29 through 360 degrees, it will slide to this position along the cam edges 56 to the point 57, as shown in Figs. 3 and 7.

From the foregoing, it will be seen that the lever 37 and associated parts constitute means for limiting each operating action of the pointer 19 to a single revolution through 360 degrees and for always stopping the pointer at one and the same point at the end of each revolution thereof.

The piston 43 and oil 44 provide for a cushioning action to protect the Bourdon tubes 15 and 16 from damage due to the high explosion pressures, but without interfering with these tubes being responsive to the variations in pressure.

By removing the connection 54 from the spark-plug 13 and clipping it onto the post 11 below the insulating section 46, the maximum pressure indicated by the pointer 24 will be the maximum pressure of compression only, since the spark-plug 13 will not fire in such case. The position of the spark across the electrode elements 17 and 19 with respect to the pointer 24 will then be an indication of the degree of advance or retard of the spark. In using the indicator in this manner, it will be understood that the engine is being driven by the power from the other cylinders thereof.

In the above case, it will be seen that the pointer 24 will continue to advance as the engine piston goes through the compression stroke thereof, and when the top of the stroke is reached, the pointer 24 will be in its farthest advance position and will remain there on account of the check-valve 49. The index 58, in the modification shown in Fig. 12, will therefore be at a position corresponding to the top dead-center position of the engine crank-shaft. The graduations on the scale 55 are evenly spaced, and this provides for sufficient accuracy in determining the maximum pressure of explosion, as in Fig. 1. However, when the connection 54 is clipped onto the post 11 to cut out the spark-plug 13, and the pointer 24 is caused to move into the position whereat the index 58 represents a datum point from which readings may be taken of degrees of spark-advance or spark-retard from top dead-center, the scale 55 is not sufficiently accurate. This is because of the fact that during a substantial angular movement of the crank-shaft through top dead-center, the piston travel is relatively small, and diminishes at a varying rate as top dead-center is approached, and increases at a varying rate beyond top dead-center. For the purpose of meeting these conditions, it is proposed to provide the pointer 24 at the end thereof with extensions 59 on which there is a true scale for degrees of crank-shaft throw either side of dead-center. This scale is sufficiently long to embrace all practical conditions, so that whenever a spark jumps the gap between the electrode elements 17 and 19, the element or pointer 19 is somewhere along the scale, as illustrated in Fig. 12.

An important feature of the disclosed embodiment of my invention resides in the fact that the pointer 19, for indicating ignition-timing, always rotates in the same direction, and does not oscillate back and forth with the pressure within the engine cylinder.

It will be understood that various modifications, within the conception of those skilled in the art, are possible without departing from the spirit of my invention or the scope of the claims.

I claim as my invention:

1. In an ignition-timing indicator for an internal combustion engine, a first electrode element in the form of a pointer supported for free rotation about an axis, a second electrode element in the form of a circular member substantially concentric about said axis and forming with said first electrode element a spark gap, means responsive to the fluid-pressure in the engine cylinder undergoing test and operable to cause rotation of said pointer about said axis responsive to an increase in such fluid-pressure, means for limiting each operating action of said pointer to a single revolution through substantially three hundred and sixty degrees and for always stopping said pointer substantially at one and the same point at the end of each revolution thereof, and electrical connection means for impressing across said electrode elements the electrical tension from the circuit to the spark plug of said cylinder to cause a spark to jump across said electrode elements.

2. In an ignition-timing indicator for an internal combustion engine having a cylinder and a piston reciprocating therein, a first electrode element in the form of a circular member, a second electrode element in the form of a pointer supported for rotary movement about an axis substantially through the center of curvature of said member and disposed with an end thereof in close proximity to the adjacent edge of said member, a second pointer supported for rotary movement substantially about said axis, means responsive to the fluid-pressure in said cylinder and operable to cause rotary movement of said pointers as the piston travels toward the head-end of the cylinder during the compression stroke, means operating to hold said second pointer in the position reached after the piston has completed its travel to the head-end of the cylinder whereby said second pointer provides a datum point representative of the top dead-center position of the piston, and electrical connection means for impressing across said electrode elements the electrical tension from the circuit to the spark plug of said cylinder to cause a spark to jump across said electrode elements whereby there is an indication of the exact point of ignition with relation to the top dead-center position of the piston.

3. In an ignition-timing indicator for an internal combustion engine having a cylinder and a piston reciprocating therein, a first electrode element in the form of a pointer supported for free rotation about an axis, a second electrode element forming with said first electrode element a spark gap, a second pointer supported for rotary movement substantially about said axis, means responsive to the fluid-pressure in said cylinder and operable to cause rotary movement of said pointers as the piston travels toward the head-end of the cylinder during the compression stroke, means operating to hold said second pointer in the position reached after the piston has completed its travel to the head-end of the cylinder whereby said second pointer provides a datum point representative of the top dead-center position of the piston, means for limiting each operating action of said first-named pointer to a single revolution through substantially three hundred and sixty degrees and for always stopping said first-named pointer substantially at one and the same point at the end of each revolution thereof, and electrical connection means for impressing across said electrode elements the electrical tension from the circuit to the spark plug of said cylinder to cause a spark to jump across said electrode elements whereby there is an indication of the exact point of ignition with relation to the top dead-center position of the piston.

PAUL K. KREISZL.